United States Patent [19]

Cremers et al.

[11] 4,167,481
[45] Sep. 11, 1979

[54] PROCESS FOR THE REMOVAL OF METALS FROM SOLUTION

[75] Inventors: Adrien E. J. Cremers, Winksele; André P. A. Maes, Kessel-Lo; Paul G. L. Piegneur, Heverlee, all of Belgium

[73] Assignee: Leuven Research & Development VZW, Louvain, Belgium

[21] Appl. No.: 818,060

[22] Filed: Jul. 22, 1977

Related U.S. Application Data

[63] Continuation of Ser. No. 665,522, Mar. 10, 1976, abandoned.

[30] Foreign Application Priority Data

Mar. 19, 1975 [NL] Netherlands .......................... 7503293

[51] Int. Cl.$^2$ .......................... B01D 15/04; C02B 1/16; C02C 5/02
[52] U.S. Cl. ...................................... 210/36; 210/38 B
[58] Field of Search .......................... 75/101 BE, 108; 106/DIG. 4; 210/28, 36, 37 B, 38 B, 42, 51-54, 58, 59; 252/181, 449

[56] References Cited

U.S. PATENT DOCUMENTS

| | | | |
|---|---|---|---|
| 3,118,831 | 1/1964 | Morris | 210/38 B |
| 3,320,033 | 5/1967 | Goren | 75/101 BE |
| 3,487,928 | 1/1970 | Canevari | 210/51 |
| 3,755,161 | 8/1973 | Yokota et al. | 210/36 |
| 3,932,274 | 1/1976 | Izumi et al. | 210/44 |

FOREIGN PATENT DOCUMENTS

| | | | |
|---|---|---|---|
| 1208497 | 2/1960 | France | 75/101 BE |
| 116023 | 5/1918 | United Kingdom | 210/33 |
| 1214532 | 12/1970 | United Kingdom . | |

OTHER PUBLICATIONS

Chemical Abstracts, 1224036, vol. 75, 1971.

*Primary Examiner*—Charles N. Hart
*Assistant Examiner*—Peter A. Hruskori
*Attorney, Agent, or Firm*—John P. Snyder

[57] ABSTRACT

Several metal ions, such as mercury, cadmium, copper, zinc, nickel and cobalt, may be removed from waste waters and similar solutions by treating such solutions with a cation exchanger in the presence of a polyamine. A treatment with clay minerals such as bentonite or montmorillonite in the presence of tetraethylenepentamine is preferred. The solution may be first combined with polyamine and then contacted with the cation exchanger, but in a preferred embodiment, the polyamine and cation exchanger are combined first to form a solid adsorbent and then contacted with the solution.

16 Claims, No Drawings

PROCESS FOR THE REMOVAL OF METALS FROM SOLUTION

This is a continuation of application Ser. No. 665,522 filed Mar. 10, 1976, now abandoned.

This invention relates to the removal of metals from metal-containing solutions such as waste waters and the like.

Many industries produce large quantities of waste water which contain metals that are detrimental to the environment and/or toxic to man and animal. Typical examples of these metals are mercury, cadmium, copper, zinc, silver and nickel. Waste waters, containing these metals are commonly produced by metal finishing electroplating, ore digestion and salt recovery plants. Since waste waters are being produced in ever increasing quantities and since the legally permissible levels of discharge are becoming more and more stringent, the purification of these waters, and particularly the removal of these various metals, becomes a problem of increasing importance.

The current procedure for the removal of metals from waste waters is precipitation of the insoluble hydroxides with alkali or lime. In the absence of complexing agents, a pH of 9 is sufficient to reduce the level of most of these metals down to 1 ppm or lower. Higher pH values are only required for some metals, such as cadmium and the attainable 1 ppm level is still relatively high for cadmium in view of its toxicity. A coprecipitation with ferric hydroxide is also used in some cases.

However, the effluents of metal-finishing and electroplating industries often contain organic chemicals such as detergents or dispersing agents, which may form complexes with one or more of these metals.

Typical examples of such chemicals are aminocarboxylic acids (ethylenediaminotetraacetate, diethylenetriaminopentaacetate, hydroxyethylethylenediaminotriacetate, nitriloacetate), oxycarboxylic acids (citrate, tartrate, gluconate) and amines (ammonia, triethanolamine, ethylenediamine, trimethylamine). All these chemicals form rather stable, water-soluble complexes with most metal ions, hampering thereby the quantitative precipitation of these metals at high pH. Under such conditions, waste waters may carry 10 ppm or more of the metals in complexed dissolved state and such amounts are discharged in the environment together with the waste water.

The invention has for its object to provide a process by which, irrespective of the presence of the aforementioned chemicals, a nearly quantitative removal of metals from waste water and other solutions, can be accomplished.

The invention provides a process for removing metals from solutions which comprises treating the solution with a cation exchanger in the presence of a polyamine. Metal ions may be quantitatively removed from solutions even extremely dilute solutions, by this process, irrespective of the presence of the aforesaid organic chemicals or other electrolytes such as sodium or calcium salts.

Experiments leading to the invention have shown that the addition of polyamines, which are capable of forming stable cationic complexes with most metal ions, to metal-containing aqueous solutions has a pronounced synergistic effect on the adsorption of these metals by a cation exchanger. In particular, it was found that tetraethylenepentamine in combination with phyllosilicates such as bentonite and montmorillonite is quite effective in reducing the concentration of copper and mercury to very low values, sometimes down to 10 ppb (parts per billion) or less. The phenomenon is based upon the formation of a cationic polyamine complex which is easily adsorbed in the cation exchanger and which is stabilized by a factor of about one thousand as compared to the complex stability in solution.

It should be understood that many of the aforesaid metal-polyamine complexes are known already per se and that the formation of such complexes on mineral cation exchangers has been studied already before. However, the studies on this subject have always been made from an analytical or diagnostic point of view and the idea of using such complex-forming and adsorption phenomena for a substantive removal of metals from solutions has seldom, if ever, occurred to research workers in this field. In the few cases that a suggestion about extracting certain metals from solution was made, these suggestions led away from the present invention by stating that such extraction is questionable or less effective. Moreover, the great difference in stability constants between metal-polyamine complexes in solution and in adsorbed state on a cation exchanger has never been found before and it was especially on the basis of this surprising discovery that the present invention could be established.

The process described in this application is suitable for the removal from aqueous solutions of all dissolved metals capable of forming stable cationic complexes with polyamines. In general, these are elements from the groups III B, IV B, V B, VI B, VII B, VIII, I B, II B, III A, IV A, V A, VI A and VII A of the Periodic System to the extent that they belong to the periods 4, 5, 6, 7 of that System and insofar certain oxidation states of these elements lead to complex formation. Evidently, not all metals from this series will be present in the solution to be purified nor have all metals necessarily to be removed from it. The choice of metals to be removed with the process of this invention depends on various factors such as the toxicity and detrimental effect of the metal in question, the cost of the pure metal and of the method used, the stability of the complex to be formed and so on. In practice, one of the chief interests lies in the removal of mercury, cadmium, copper, zinc, silver, nickel and cobalt which are often present in industrial waste waters and are detrimental to the environment while the recovery of silver is also desirable by reason of its high price.

In carrying out the invented process, one may use any type of aqueous solution containing one or more valuable metals from the above groups in a dissolved state. Thus, the starting material is not restricted to waste waters but it may include solutions of various origin, for example solutions derived from reclaiming low-grade ores. No limits need be set to the concentration of metal to be removed from the starting solution. If desired, the bulk of the metal may be removed from solution by means of some other method such as precipitation of metal hydroxide with lime or alkali and the residual metal be removed then by the invented process.

In case the concentration of the metal to be removed is rather low, then the efficiency of the process can be estimated in advance on the basis of the equilibrium concentration of free metal in the presence of the polyamine complex. The cationic complexes of polyamines with most metal ions are well known and the corresponding stability constants are easily found in handbooks. In this way, one may check whether the use of the present invention is worthwhile or not.

Should anionic complexing agents be present in the aqueous solution, then this presence does not necessarily have a negative effect on the efficiency of the process. In many cases, these chemicals can form anionic complexes with the metals to be removed but an addition of polyamines will lead to a displacement of the metals from such complexes to form the more stable polyamine complexes which, upon adsorption into the ion exchanger are further stabilized and removed. Accordingly, the presence of anionic complexing agents presents little problems in most cases.

Should the solution contain other complexing agents which can form cationic complexes, then there is evidently no negative effect on the efficiency of the process, since their presence can only enhance the effect of the polyamine to be added. The invented process can therefore be carried out irrespective of the presence of complex forming chemicals.

The acidity of the aqueous solution is not critical but in most cases the removal of metals from solution by means of a polyamine and a cation exchanger proceeds satisfactorily between a pH of 6.5 and 9. For some elements such as mercury which form extremely stable complexes, the process can be carried out even at lower pH values. In general however, no complexes will be formed at very acid pH and difficulties in processing may occur at very alkaline pH.

As to the polyamine, any type of organic chemical carrying two or more amino groups can be used provided it forms cationic complexes with these metals. Typical examples of these chemicals are ethylenediamine, propylenediamine, triaminotriethylamine, diethylenetriamine, triethylenetetramine, tetraethylenepentamine, tetra-2-aminoethylethylenediamine etc. . . . If desired, carboxyl groups, hydroxyl groups and/or other substituents may be present in the molecule provided they do not weaken the complex-forming effect of the polyamine. In practice, one should choose a polyamine which forms a metal complex of sufficiently high stability with the metal to be removed so as to exceed the stability of complexes of the metal with other complexing agents which may already be present. In general, the best results are obtained with polyamines containing four or more amino groups.

The amount of polyamine to be used should at least be equal to the amount of the metal—on a molar basis—in the case of the formation of 1—1 complexes, as for example with copper and tetramine or pentamine. In case complexes of the type 1-2 are formed, as for copper with diamines and triamines, then at least a two-fold excess of polyamine is to be added with respect of the amount of metal present. The question which type of complex will be formed, is dependent from the nature of metal and polyamine and the exact type of complex may be readily be established beforehand by consulting available handbooks on this subject.

When a large excess of anionic complex forming agents is present in the solution, somewhat higher doses of polyamine may be needed to obtain optimum results. Such higher doses have an additional advantage in that they mostly lead to a better flocculation of the cation exchanger which may settle more rapidly and be filtered off more easily.

Any organic or inorganic material having cation-exchange properties can be taken as a cation exchanger. Among the inorganic cation exchangers the most suitable materials are synthetic or natural tectosilicates and synthetic or natural phyllosilicates (clay minerals).

Examples of useful tectosilicates are ultramarines and zeolites, both synthetic (zeolite A, zeolite X, zeolite Y, zeolite L, zeolite $\Omega$) and natural (chabazite, erionite, heulandite, mordenite, clinoptilolite). Examples of useful phyllosilicates are attapulgite, vermiculite, montmorillonite, bentonite, illite, micas and hydromicas, kaolinite, chrysotyle. These ion exchangers may be used as such or mixed with conventional additives such as for instance organic or inorganic granulates, agglomerants, diluters and binders.

Which type of cation exchangers will be used depends on various circumstances such as the molecular volume of the metal complex to be adsorbed, the pore structure of the ion exchanger, the initial concentration of the metal in solution, the exchange capacity of the ion exchanger, the desired efficiency and the cost of the materials.

For the removal of copper and mercury from aqueous solutions, best results were obtained with montmorillonite and bentonite as ion exchangers combined with tetraethylenepentamine as polyamine. The efficiency was then invariably better than 99%.

The amount of cation exchanger to be used is not critical. In general, this amount will depend on various factors such as the ion capacity of the ion exchanger and the concentration of the metal ion to be removed from solution. In practice, amounts of cation exchanger of about 20 gram per gram of metal turned out satisfactory though one may use doses of 3 to 30 gram of cation exchanger per gram of metal with equally good result.

Regarding the order of addition of polyamine and cation exchanger, various embodiments are possible.

In a first embodiment, the polyamine is added to the aqueous solution first, so as to form a cationic complex of the polyamine with the metal present in solution, and then the solution is contacted with the cation exchanger so as to adsorb the previously formed complex onto the ion exchanger. After separation of the ion exchanger and the liquid, a residual solution is obtained from which the metal has been removed to a sufficient extent.

The contact between cation exchanger and polyamineadded liquid may be effected in any appropriate way. Both continuous and discontinuous methods are possible. In the case of small volumes of solution, one may use a simple column through which the liquid percolates in a continuous fashion; in case of large volumes of liquid to be treated, a discontinuous method seems preferable.

Using this embodiment, it is often possible to obtain efficiencies of 99% or better in one single treatment, the residual metal content in the aqueous solution being then around 1 ppm. A repetition of this treatment may easily reduce the residual metal content in aqueous solution to about 1 ppb or less. If desired, a counter-current treatment may be used.

In a second embodiment, the polyamine and cation exchanger are combined in advance to form a solid adsorbent which is subsequently contacted with the aqueous solution. The metal ions from the solution will then react with polyamine in the adsorbent to form a complex, thereby being fixed onto the exchanger simultaneously. After separation of the adsorbent and the liquid, the result is a solution from which the metal is removed to a sufficient extent.

In the case of using a clay material such as bentonite or montmorillonite in combination with tetraethylenepentamine (called tetren hereafter) the solid adsorbent may be prepared as follows:

A solution of the polyamine is adjusted to a pH of about 7 with acid and mixed with an aqueous suspension of the clay mineral in such a proportion that 0.3 millimoles of tetren per gram of clay mineral are used. At this pH, tetren occurs as a trivalent cation which is strongly adsorbed onto the clay. When the clay is saturated completely with polyammonium ions, the slurry is filtered and dried and finally ground.

In the case of combining bentonite or montmorillonite with diethylenetetramine (hereafter called dien), the procedure will be the same, with the exception that 0.5 millimoles of dien per gram of clay mineral are used.

When the adsorbent, prepared as just described, is used in the removal of metals from solutions—even extremely dilute solutions with a metal content of only a few milligrams per liter—the procedure is as follows. A certain amount of solid adsorbent, dependent from the metal content of the solution, is contacted with the solution and maintained in contact therewith for some time. At the surface of the adsorbent, an exchange reaction between metal ions from solution and protons from the adsorbed polyammonium ions will occur. Thus, metal ions from solution are bonded to the clay as a stable amine complex. The liberated protons will cause a decrease in pH of the solution and therefore, it is advisable to neutralise these protons by addition of alkali. The exchange process is diffusion-controlled and the contact time should be sufficiently long to ensure good results: in general, a contact time of two hours will be sufficient.

Contact of the adsorbent with the solution may be effected in different ways but a discontinuous method is preferred on account of the extended contact time.

In this embodiment, a single treatment is generally sufficient to reduce the metal content of the solution by a factor of about 100 or somewhat less, depending on the initial concentration of the metal ions and the nature and concentration of other complex forming chemicals which might be present. This embodiment is completely insensitive to the presence of alkali metal or alkaline earth metal ions. Such cations, which are not to be removed, may be present in fairly large excess without any detrimental effect. The presence of anionic complexing agents such as citrate or tartrate does reduce the treatment efficiency to some extent but a residual metal content of less than 1 ppm is easily accomplished. In some cases, it is possible to reduce the metal content to a few parts-per-billion, even in the presence of ethylenediaminetetraacetate which forms extremely stable anionic complexes.

The liquid which has been treated by the invented process comprises only a fraction of the initial content of undesired metals and may be discharged into a sewer or surface water or, optionally be processed to recover other components.

The metal which has been fixed onto the cation exchanger or adsorbent during the process may be desorbed by a treatment with acids such as concentrated hydrochloric acid or nitric acid. However, such a recovery is only useful when dealing with costly or rarely available metals such as silver. In other cases, the ion-exchanger loaded with the metal-polyamine complex may simply be discharged and this is a safe procedure because the metal is no longer apt to have any detrimental effect.

EXAMPLE 1

A natural aluminosilicate (montmorillonite from Camp Berteau, Morocco) was mixed with a series of aqueous solutions containing the following amounts of metal and polyamine:

(a) 20 ppm of mercury and 42 ppm of ethylenediamine.
(b) 20 ppm of mercury and 33 ppm of propylenediamine.
(c) 20 ppm of mercury and 50 ppm of diethylenetriamine.
(d) 20 ppm of mercury and 24 ppm of triethylenetetramine.
(e) 20 ppm of mercury and 30 ppm of tetraethylenepentamine.

The amount of clay used in all cases was 2.5 gram per liter and the pH values were 6.9, 6.6, 7.3, 6.2 and 6.2, respectively. After reaching equilibrium the mercury concentration in the solutions was found to be reduced to the following values:

(a) 0.1 ppm of mercury, efficiency 99.5%.
(b) 0.1 ppm of mercury, efficiency 99.5%.
(c) 0.13 ppm of mercury, efficiency 99.4%.
(d) 0.05 ppm of mercury, efficiency 99.8%.
(e) 0.02 ppm of mercury, efficiency 99.9%.

EXAMPLE 2

A natural aluminosilicate (Wyoming Bentonite) was mixed with aqueous solutions containing the following concentrations of metal and polyamine:

(a) 50 ppm of mercury, 200 ppm of calcium and 150 ppm of tetraethylenepentamine.
(b) 100 ppm of mercury and 380 ppm of tetraethylenepentamine.

The amount of clay as used was always 2.5 gram per liter and the pH was 7.1 After reaching equilibrium, the mercury concentration was found to be reduced to 0.08 ppm and 0.5 ppm resp. which correspond to efficiencies of 99.8 and 99.5% respectively.

EXAMPLE 3

An aqueous solution containing 10 ppm of mercury and 200 ppm of calcium with, in addition, one of the following:

(a) no complexing agent.
(b) 190 ppm of citrate.
(c) 325 ppm of EDTA, was mixed with 20 ppm of tetraethylenepentamine and 250 ppm of natural aluminosilicate (montmorillonite from Camp Berteau, Morocco). The pH value was 8. After 2 hours, the mercury concentration had been reduced to (a) 56 ppb, (b) 50 ppb and (c) 52 ppb. A second treatment with 400 ppm of the same clay in the presence of 20 ppm tetraethylenepentamine reduced the mercury concentration further to 8–11 ppb in all three cases, which corresponded to an overall efficiency of about

EXAMPLE 4

A natural aluminosilicate (montmorillonite from Camp Berteau, Morocco) was mixed with a series of aqueous solutions containing 200 ppm of calcium and in addition:

(a) 16 ppm of copper with 40 ppm of ethylenediamine.
(b) 32 ppm of copper with 70 ppm of ethylenediamine.
(c) 48 ppm of copper with 100 ppm of ethylenediamine.
(d) 64 ppm of copper with 130 ppm of ethylenediamine.

In each case, the pH was adjusted to about 7, and the amount of clay as used was 2.5 gram/liter. After equilibrium, the copper concentration was 33 ppb (a), 82 ppb (b), 141 ppb (c) and 181 ppb (d), respectively, which corresponded to efficiencies of 99.6 to 99.8%. In the absence of ethylenediamine, the efficiency varied between 35 and 40%.

EXAMPLE 5

A synthetic aluminosilicate (zeolite Y, Union Carbide) was mixed with a series of aqueous solutions containing the following amounts of metal and polyamine:
(a) 32 ppm of copper and 70 ppm of ethylenediamine.
(b) 64 ppm of copper and 130 ppm of ethylenediamine.
(c) 96 ppm of copper and 190 ppm of ethylenediamine.

The pH was about 7 and the zeolite content about 3 gram per liter. After equilibrium, the copper concentration had been reduced to 35 ppb (a), 120 ppb (b) and 0.56 ppm (c) respectively which corresponded to efficiencies of at least 99.5%. In the absence of ethylenediamine, the equilibrium concentration of copper was at least 5-10 times larger. The equilibrium concentration of ethylenediamine varied between 1 and 2 ppm which means that 99% of the amine has been coadsorbed.

EXAMPLE 6

The same material as in example 4 is mixed with a series of aqueous solutions containing 32 ppm of copper and in addition:
(a) 70 ppm of ethylenediamine.
(b) 100 ppm of propylenediamine.
(c) 100 ppm of diethylenetriamine.
(d) 100 ppm of triethylenetetramine.
(e) 100 ppm of tetraethylenepentamine.

The pH was always between 7 and 8 while the amount of clay as used was 3 gram per liter. After equilibrium, the copper concentration had been reduced to less than 10 ppb in all cases which corresponded to an efficiency of at least 99.95%. In the absence of polyamine, the equilibrium concentration of copper was always higher by a factor of 20 or more.

EXAMPLE 7

A natural aluminosilicate (Wyoming Bentonite) was mixed with a solution containing 32 ppm of copper, 200 ppm of calcium and 190 ppm of tetraethylenepentamine at a pH of 8. After equilibrium, the copper concentration in solution was 40 ppb which corresponds to an efficiency of 99.8%. The efficiency in the absence of polyamine was 35%.

EXAMPLE 8

A natural aluminosilicate (montmorillonite from Camp Berteau, Morocco) was mixed with a series of aqueous solutions containing 3.2 ppm of copper, 200 ppm of calcium, 19 ppm of tetraethylenepentamine and in addition (a) 150 ppm of tartrate, (b) 190 ppm of citrate, (c) 325 ppm of ethylenediamine tetraacetate. The clay content was 200 ppm and the pH 7.5. After equilibrium, the copper concentration was 0.29 ppm (a), 0.26 ppm (b) and 0.21 ppm (c) respectively which corresponded to efficiencies of 92–94%. No copper was adsorbed in the absence of polyamine.

EXAMPLE 9

A natural aluminosilicate (montmorillonite from Camp Berteau, Morocco) was mixed with two solutions containing each 200 ppm of calcium and in addition (a) 3.3 ppm of zinc and 19 ppm of tetraethylenepentamine; (b) 3.3 ppm of zinc, 19 ppm of tetraethylenepentamine and 190 ppm of citrate. The amount of ion exchanger as used was 200 ppm and the pH was 7. After equilibrium, the zinc concentration was 70 ppb (a) and 60 ppb, respectively. In this way, about 50% of the ion exchange capacity of the clay was used. A second treatment of the supernatent liquid with clay and polyamine reduced the zinc content in both cases to 1 ppb.

EXAMPLE 10

A natural aluminosilicate (montmorillonite from Camp Berteau, Morocco) was mixed with two solutions containing each 200 ppm of calcium and in addition (a) 3 ppm of nickel and 19 ppm of tetraethylenepentamine, (b) 3 ppm of nickel, 19 ppm of tetraethylenepentamine and 190 ppm of citrate, respectively. The amount of ion exchanger as used was 200 ppm and the pH was 7. After equilibrium, the nickel concentration was 100 ppb (a) and 65 ppb (b) respectively. In this way, about 5% of the ion exchange capacity of the clay was used. A second treatment of the supernatant liquid with clay and polyamine reduced the nickel content further to 2–3 ppb in both cases.

EXAMPLE 11

A solution of $2 \times 10^{-3}$ M EDTA which contained $Fe^{+++}$ was neutralized to pH 7 with alkali and the precipitate was separated off.

The clear supernatant was diluted by a factor of two and tetraethylenepentamine and zinc were added in such quantities as to obtain a solution containing 0.3 gram of EDTA, 20 ppm of tetraethylenepentamine, 3 ppm of zinc and some $Fe^{+++}$.

This solution was mixed with 40 mg of montmorillonite. After equilibrium, the pH was 7 and the concentration of zinc ions had been reduced to 0.3 ppm. In this way, about 50% of the exchange capacity of the ion exchanger was used. A second treatment led to a further reduction of the zinc concentration to 10 ppb.

EXAMPLE 12

A solution containing 10 ppm of mercury and 200 ppm of calcium and in addition: (a) no complex forming chemicals, (b) 190 ppm of citrate or (c) 320 ppm of EDTA is treated with 400 mg per liter of a solid adsorbent comprising tetren and bentonite, and prepared as described above. After agitating for two hours and neutralising with sodium hydroxide, the mercury concentration was found to be reduced to (a) 45 ppb, (b) 83 ppb and (c) 65 ppb which corresponded to an efficiency of at least 99%. A second treatment of the supernatant solution with 400 ppm of tetrenbentonite reduced the mercury content further to 2–4 ppb in all three cases.

EXAMPLE 13

A solution containing 1 mg/l of mercury was treated with 30 mg/l of tetrenbentonite. After two hours of agitation with simultaneous addition of sodiumhydroxide to keep the pH at 7, the mercury concentration had been reduced to 45 ppb. A second treatment with 20 ppm of tetrenbentonite reduced the mercury content further to 2–3 ppb.

EXAMPLE 14

A solution containing 6 ppm of nickel was treated with 500 ppm of tetrenmontmorillonite. After two hours of agitation and occasional addition of NaOH to keep the pH at about 7, the nickel concentration had been reduced to 60 ppb. A second treatment with 300 ppm of tetrenmontmorillonite reduced the nickel concentration further to 7 ppb.

EXAMPLE 15

A solution containing 3 ppm of nickel and 200 ppm of calcium with (a) no complex forming chemicals, (b) 190 ppm of citrate, was shaken for two hours with 400 ppm of tetrenbentonite. After two hours of shaking, wherein the pH was kept constant at a value of 7, through NaOH-addition, the nickel concentration had been reduced to 100-120 ppb. A second treatment with 400 ppm of tetrenbentonite reduced the nickel concentration further to 15 ppb in both cases.

EXAMPLE 16

A solution containing 5.6 ppm of cadmium and 200 ppm of calcium and in addition (a) no complex forming chemicals, (b) 190 ppm of citrate, was agitated for two hours with 400 ppm of tetrenbentonite, keeping the pH at about 7 by NaOH-addition. After 2 hours the cadmium concentration was found to be reduced to 0.45 ppm (a) and 0.95 ppm (b). A second treatment with 400 ppm of tetrenbentonite reduced the cadmium content further to 18 ppb (a) and 25 ppb (b).

EXAMPLE 17

A solution containing 3.25 ppm of silver and 200 ppm of calcium was mixed for two hours with tetrenbentonite, keeping the pH constantly at a value between 7 and 8 by NaOH-addition. After two hours, the silver concentration was found to be reduced to 22 ppb which corresponds to an efficiency

EXAMPLE 18

A solution containing 3.3 ppm of zinc and 200 ppm of calcium and in addition; (a) no further complexing agent, (b) 190 ppm of citrate, (c) 325 ppm of EDTA, was mixed with 400 ppm of tetrenbentonite. After 2 hours of mixing, keeping the pH at about 8, by NaOH-addition, the zinc concentration was found to be reduced to (a) 95 ppb, (b) 100 ppb or (c) 540 ppb respectively. A second treatment with 400 ppm of tetrenbentonite reduced these concentrations further to (a) 16 ppb, (b) 23 ppb and (c) 65 ppb respectively, which corresponded to an overall efficiency of 98% or better.

EXAMPLE 19

A solution containing 3.2 ppm of copper, 3.3 ppm of zinc, 3 ppm of nickel and 5.6 ppm of cadmium was treated with 1000 ppm solid adsorbent made from tetren and bentonite. After 2 hours of mixing, keeping the pH constantly at a value of about 8, the concentrations of these metals were found to be reduced to respectively 20 ppb in Cu, 64 ppb in Zn, 7 ppb in nickel and 250 ppb in Cd, which corresponded with efficiencies varying between 95% (Cd) and 99.7% (Ni). A second treatment with 1000 ppm of tetrenbentonite reduced these concentrations further to 4 ppb in Cu, 5.5 ppb in Ni, 4 ppb in Zn, and 6.5 ppb in Cd, which corresponded with overall efficiencies of about 99.9%.

What we claim is:

1. A process of removing metals from an aqueous solution containing ions of at least one dissolved metal therein which is capable of forming stable cationic complexes with polyamines and which has to be removed from said solution, said process comprising the steps of:

(a) adding to said solution a polyamine selected from the group consisting of ethylenediamine, propylenediamine, triaminotriethylamine, diethylenetriamine, triethylenetetramine, tetraethylenepentamine and tetra-2-aminoethylethlenediamine in order to form stable cationic complexes with the ions of said one metal, said polyamine being added in at least equimolar amount with respect to said metal;

(b) contacting the solution of step (a) with a cation exchanger selected from the group consisting of synthetic and natural tectosilicates and phyllosilicates, in an amount of 3 to 30 grams of cation exchanger per gram of metal ion to be removed from solution, in order to adsorb said stable cationic metal-polyamine complexes from said aqueous solution onto said cation exchanger, and (c) separating said cation exchanger from said aqueous solution after contact.

2. The process as claimed in claim 1, wherein said at least one dissolved metal is selected from the group consisting of elements from groups III B, IV B, V B, VI B, VII B, VIII, I B, II B, III A, IV A, V A, VI A, and VII A of the Periodic System of Elements as far as comprised in periods 4,5,6 and 7 of that System and as far as being capable of forming stable cationic complexes with polyamines.

3. A process of removing metals from an aqueous solution containing ions of at least one metal dissolved therein which is capable of forming stable cationic complexes with polyamines and which has to be removed from the solution, said process comprising the steps of:

(a) combining a polyamine selected from the group consisting of ethylenediamine, propylenediamine, triaminotriethylamine, diethylenetriamine, triethylenetetramine, tetraethylenepentamine and tetra-2-aminoethylethylenediamine with a cation exchanger selected from the group consisting of synthetic and natural tectosilicates and phyllosilicates in order to form a solid adsorbent, said polyamine and said cation exchanger being combined in such a mutual ratio as to ensure that at least an equimolar amount of polyamine is present with respect to said metal when the resulting solid adsorbent is added to said aqueous solution in an amount corresponding to 3-30 grams of cation exchanger per gram of metal ion to be removed from solution;

(b) contacting said aqueous solution with said solid adsorbent in order to adsorb said metal ion from said solution and form stable cationic polyamine-metal complexes on said cation exchanger in said solid adsorbent, said solid adsorbent being used in an amount corresponding to 3 to 30 grams of cation exchanger per gram of metal ion to be removed from solution; and (c) separating said solid adsorbent from said aqueous solution after contact.

4. The process as claimed in claim 3, wherein said at least one dissolved metal is selected from the group consisting of elements from groups III B, IV B, V B, VI B, VII B, VIII, I B, II B, III A, IV A, V A, VI A, and VII A of the Periodic System of Elements as far as comprised in periods 4,5,6 and 7 of that System and as far as being capable of forming stable cationic complexes with polyamines.

5. The process as claimed in claim 3, wherein said at least one dissolved metal is selected from the group consisting of mercury, cadmium, copper, zinc, nickel and cobalt.

6. The process as claimed in claim 3, wherein said polyamine has at least 4 amino groups per molecule.

7. The process as claimed in claim 3, wherein tetraethylenepentamine is used as a polyamine and at least one of montmorillonite and bentonite is used as a cation exchanger, and said aqueous solution contains at least one of copper and mercury ions as dissolved metal ions to be removed.

8. The process as claimed in claim 3, wherein said polyamine is combined with said cation exchanger by admixing said polyamine to an aqueous slurry of said cation exchanger at a pH of about 7, separating a resulting solid adsorbent from said slurry and drying said solid adsorbent.

9. The process as claimed in claim 3, wherein said aqueous solution is a waste water derived from at least one of metal-processing and metal-plating industries.

10. The process as claimed in claim 3, wherein contact of said solid adsorbent with said aqueous solution is effected during a period of about 2 hours.

11. The process as claimed in claim 3, wherein said contact is effected batchwise.

12. The process as claimed in claim 11 wherein said at least one dissolved metal is selected from the group consisting of mercury, cadmium, copper, zinc, nickel and cobalt.

13. The process as claimed in claim 11, wherein said polyamine has at least four amino groups per molecule.

14. The process as claimed in claim 11, wherein tetraethylenepentamine is used as a polyamine and at least one of montmorillonite and bentonite is used as a cation exchanger, and said aqueous solution contains at least one of copper and mercury ions as dissolved metal ions to be removed.

15. The process as claimed in claim 11, wherein said aqueous solution is a waste water derived from at least one of metal-processing and metal-plating industries.

16. The process as claimed in claim 11, wherein said contact is effected batchwise.

* * * * *